(12) United States Patent
Cole

(10) Patent No.: US 6,621,083 B2
(45) Date of Patent: Sep. 16, 2003

(54) HIGH-ABSORPTION WIDE-BAND PIXEL FOR BOLOMETER ARRAYS

(75) Inventor: Barrett E. Cole, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 43 days.

(21) Appl. No.: 09/751,338

(22) Filed: Dec. 29, 2000

(65) Prior Publication Data

US 2003/0020017 A1 Jan. 30, 2003

(51) Int. Cl.$^7$ .................................................. G01J 5/02
(52) U.S. Cl. ....................................................... 250/338.1
(58) Field of Search ......................................... 250/338.1

(56) References Cited

U.S. PATENT DOCUMENTS

| | | | |
|---|---|---|---|
| 5,367,167 A | 11/1994 | Keenan | 250/338.4 |
| 5,688,699 A | 11/1997 | Cunningham et al. | 437/3 |
| 5,949,119 A | 9/1999 | Vilain | 257/420 |
| RE36,706 E | * 5/2000 | Cole | 250/338.1 |
| 6,144,285 A | * 11/2000 | Higashi | 257/467 |

FOREIGN PATENT DOCUMENTS

| | | | |
|---|---|---|---|
| EP | 0534768 A1 | 3/1993 | G01J/5/20 |
| WO | WO 00/33040 | 6/2000 | G01J/5/20 |

* cited by examiner

Primary Examiner—Constantine Hannaher
(74) Attorney, Agent, or Firm—Kris T. Fredrick

(57) ABSTRACT

A microbolometer array has pixels with a thin platform of silicon dioxide having a metal absorber layer, and having a resonant gap with a substrate reflector. The pixel resistor of vanadium oxide has low total resistance with metal contacts on opposite edges.

24 Claims, 5 Drawing Sheets

HIGH-ABSORPTION WIDE-BAND PIXEL FOR BOLOMETER ARRAYS

TECHNICAL FIELD

The present invention concerns thermal imaging, and more specifically concerns improved pixels or cells for arrays of bolometers.

BACKGROUND

Night vision and related applications can be realized by receiving the infrared radiation emitted by warm bodies in an array of detectors whose electrical output signals are converted into a visible image. The individual detectors, called cells, elements, or pixels, must be very small. They should also be sensitive to radiation over a wide band of the infrared spectrum, have minimal noise at ambient temperatures, operate at high sensitivity, and be inexpensive to manufacture.

Arrays of uncooled bolometers on a semiconductor substrate offer a promising approach to room-temperature infrared imaging. Such arrays also have shortcomings in several different respects. Wide bandwidth is difficult to achieve, and is sensitive to a large number of interacting factors in the structure and materials of the individual pixels. Noise can swamp the useful signals when the array is not cooled to cryogenic temperatures. Good sensitivity to minute temperature differences requires high absorption of incident radiation, and this is frequently detrimental to other design goals. While nanotechnology techniques have been employed for constructing bolometer arrays, the expense of meeting the operational goals can lead to high fabrication costs and low yields, especially for arrays having large numbers of individual image elements or pixels.

SUMMARY

An array of bolometers according to the invention has a wide bandwidth in the infrared spectrum for increasing the range of temperatures that contribute to an image. It has a high absorption for increased sensitivity to temperature differences. Its structure, materials, and manufacture balance tradeoffs between competing factors in a way that reduces the cost of fabrication.

These and other goals are achieved in an uncooled array of thin bolometer pixels having a highly isolated platform structure of absorbing material separated from a substrate by a predetermined gap. A reflecting layer can increase efficiency and bandwidth. The array can also include a shaped resistor of material having a relatively low total resistance while maintaining a high resistance change with very small temperature differentials.

DRAWING

DETAILED DESCRIPTION

Figure 1:
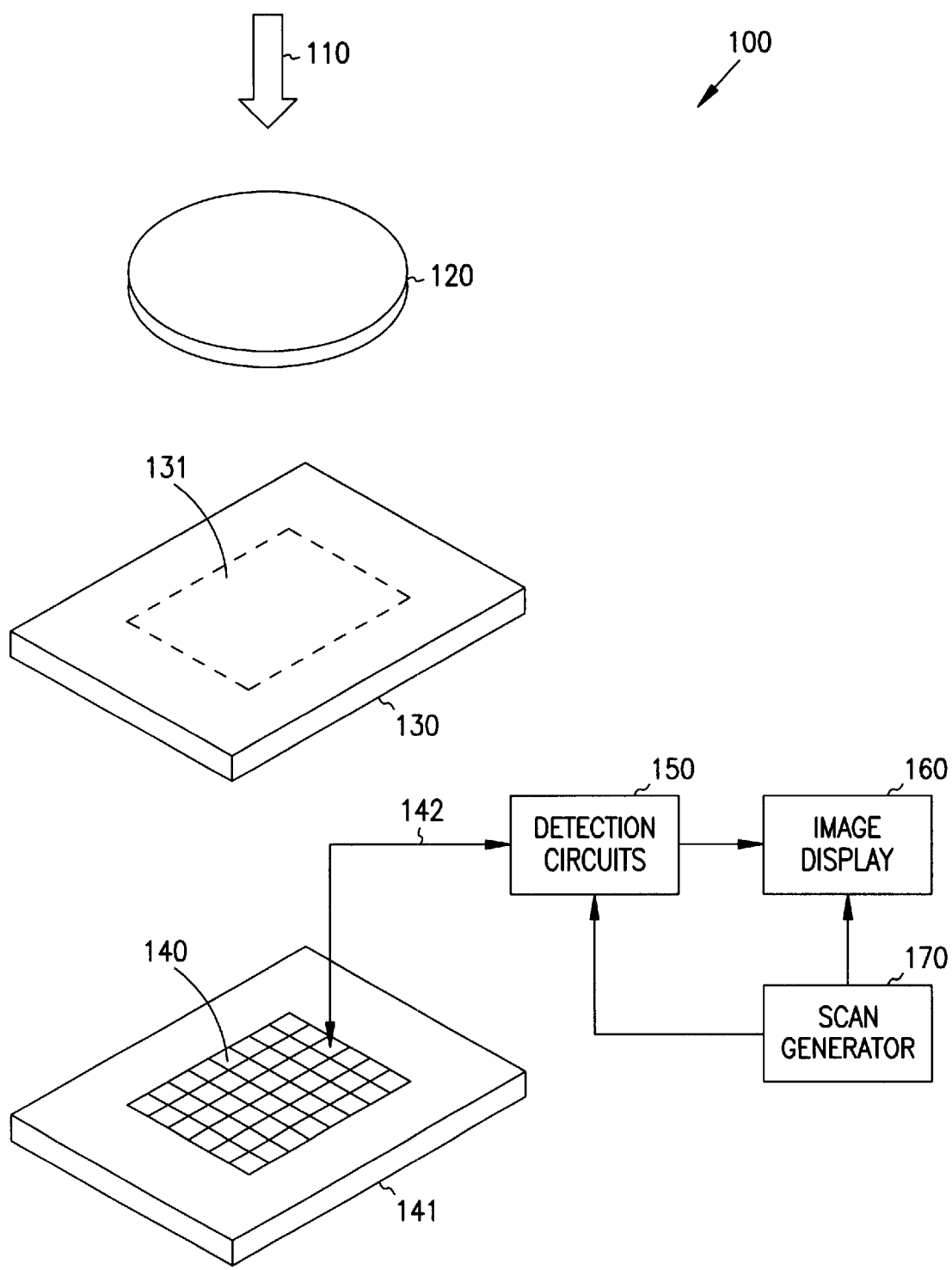
FIG. 1 shows an infrared imager having pixels according to the invention.

FIG. 1 is a stylized view of a representative infrared imaging detector 100 having pixels constructed according to the invention. Arrow 110 represents infrared radiation produced by a warm body and transmitted to infrared imaging optics 120 of conventional design. Package 130 has a window area 131 transparent to infrared wavelengths for transmitting radiation 110. Sealing package 130 and evacuating the atmosphere therefrom is desirable in many applications to increase sensitivity and inter-pixel isolation, and to reduce contamination and degradation.

Rectangular bolometer array 140 within package 130 is fabricated on a substrate 141 of silicon or similar material having appropriate electrical and micromachining properties. A typical array measures about 5–15 mm on a side. In many applications, such as night-vision imagers, array 140 operates at ambient temperatures, e.g., in the approximate range of −40° C. to +100° C. It is possible, however, to operate the array at much lower temperatures, e.g., below about 2K to 20K, either by cooling the array or by operating it in an environment such as space. Row and column wiring 142 reads out the electrical signals representing the temperature of each individual pixel such as 200, and may also introduce scanning signals for time-multiplexing the pixel signals.

Detector 150 performs conventional functions such as integrating, amplifying and demultiplexing the pixel signals. Unit 160 receives the processed signals and presents a visible image to a viewer. In other embodiments, unit 150 might be replaced or augmented by a recorder or other device for storing signals representing one or more successive images, or for other processing of the signals. Therefore, the term "display" should be taken in a broad sense. Scan generator 170 can be included for multiplexing the pixel signals and/or for controlling the display or processing of images on unit 160. System 100 represents an example environment for the present invention; others are possible.

Figure 2:
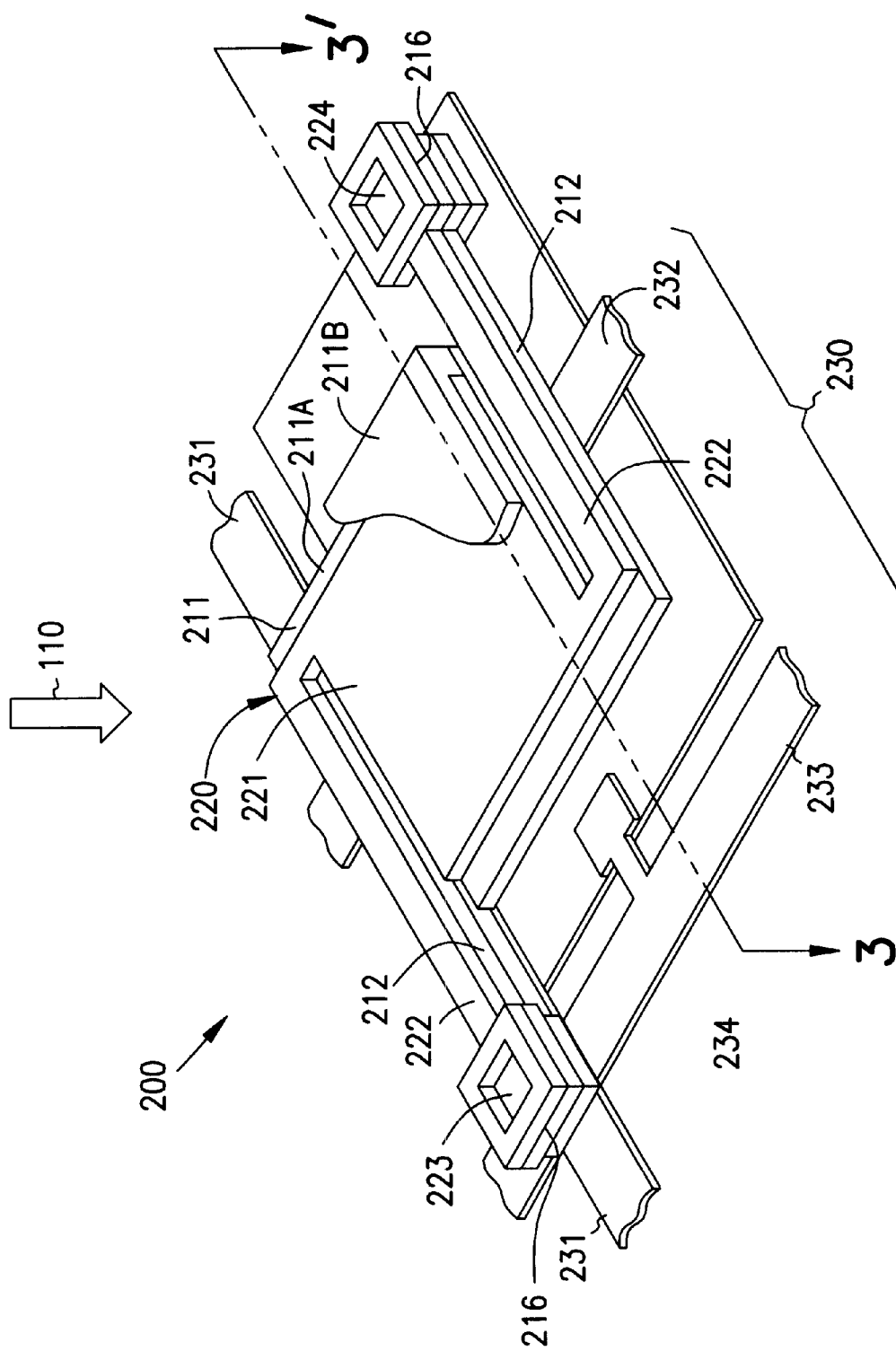
FIG. 2 is an isometric view of one of the pixels of FIG. 1.
Figure 3:
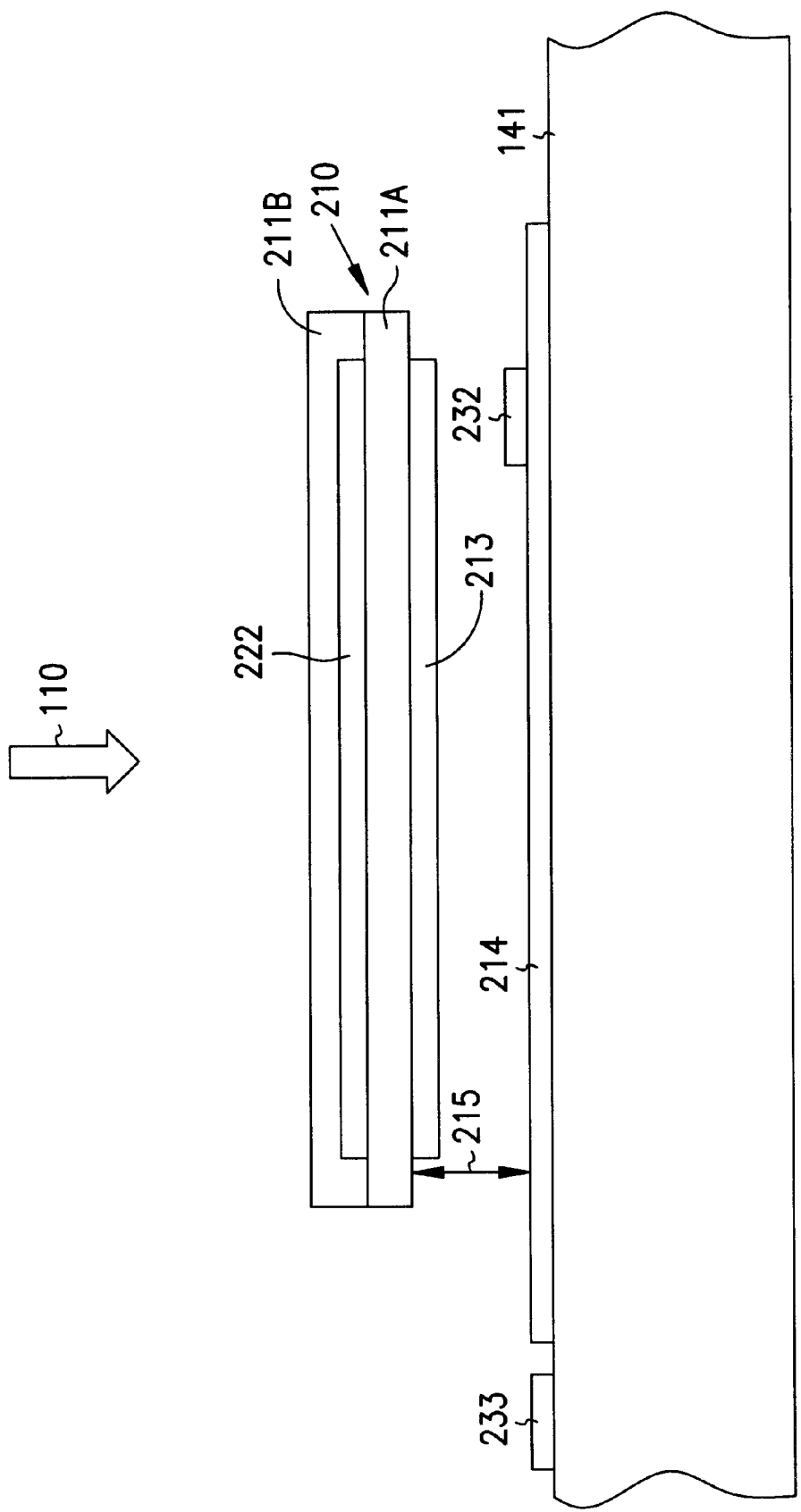
FIG. 3 is a cross section taken along the line 3–3' of FIG. 2.

FIG. 2 details one of the bolometer pixels 200 constructed on substrate 141 of array 140, FIG. 1. FIG. 3 shows a cross section along line 3–3' of FIG. 2; for simplicity of exposition, only the components in the plane of line 3–3' are shown. Such pixels are sometimes called microbolometers. Their small size, typically about 50 micrometers square or less, gives a fast response time suitable for use in focal-plane imaging arrays of 120×160 pixels or more, for producing images in real time at frame rates up to 30/sec. An entire array of pixels is generally fabricated in situ by micromachining a wafer of silicon or other suitable material. Sacrificial layers allow material to be undercut where desired.

Platform 210 absorbs incident infrared radiation 110, producing a temperature change that can be sensed. (In the technology, the term "pixel" is sometimes applied to this platform alone; this usage will be abjured herein.) Platform 210 is thermally isolated as much as possible from substrate 141 and from adjacent pixels. Central area or body 211 has a substantially rectangular shape so that pixels can be tiled closely together in array 140. Because this consideration dominates platform shape, the term "rectangular" must be taken in a broad sense as including other shapes that can substantially tile a plane, such as squares, parallelograms, trapezoids, and even hexagons. Platform 210 also includes arms 212 that are as long and thin as practicable for mechanical support, so as to increase thermal isolation of central body 211 from substrate 141 and from adjacent pixels. The arms are folded so as to allow adjacent pixels to be spaced more closely together, improving the fill factor of the array.

The central body of a bolometer must contain an absorber, because its primary operational function is to produce a temperature change that can be detected. Central body 211 comprises two separate layers, a lower layer 211A and an upper layer 211B. Layer 211B, shown partially broken away in FIG. 2, is silicon dioxide, and can be about 0.2 micrometer thick. Silicon dioxide is preferred because of its very low conductivity, and low refraction index (n≈1.5). Lower layer 211A is less critical; it can be a layer of silicon dioxide or silicon nitride, on the order of 0.1 micrometer thick. Central body 211 has a very small overall thickness, less than about 0.5 micrometer, with a preferred thickness of about 0.3 micrometer, or less if permitted by the technology. The use of such a thin absorber platform improves efficiency by presenting a large relative area to the incident radiation, while shortening response time for real-time imaging through a small total volume and mass. However, although silicon dioxide (and silicon nitride as well) is a good absorber, this thinness decreases the capacity of the platform to absorb radiation. Fabricating a metal layer 213 below layer 211 A, i.e., on the lower surface of platform 210, restores this capacity without adding appreciable thickness—that is, while maintaining the advantages of a thin platform. Metal layer 213 has a further advantage in that metals have broad-band absorption characteristics. Thickness of this layer depends upon the particular metal employed; for nickel-chromium (Ni:Cr, Nichrome), a thickness of about 10 nm has suitable properties, and adds only a few percent to the total platform thickness. It has been observed that the thermal properties of such a metal layer can be characterized for the present purpose by its electrical sheet resistance; a film of about 360±200 Ω/square is preferred. The absorption in central body 211 in fact occurs principally in this layer located on the bottom of the body. (Detector material 222, described below, generally has negligible absorption.)

A fraction of the incident radiation passes through platform 210 to substrate 141, even in the presence of metal layer 213. A reflective metal layer 214, typically a 500 Å film of Ni:Cr, is formed on top of substrate 141 to reflect as much as possible of this fraction back into central body 211. Most of the reflected heat is then absorbed, thus increasing the overall efficiency of the pixel. Absorption is enhanced by placing metal layer 213 on the lower side of platform 210, directly facing reflector 214.

Proper spacing of platform 210 from the substrate further enhances pixel efficiency by increasing absorption over a desired wavelength band. If the gap 215 from platform to substrate (actually, to reflector 214) has a depth selected with respect to the wavelengths of interest, radiation within that band resonates in the gap so as to enhance absorption within body 211 of the radiation reflected from layer 214. In an example. detector having a desired band of 8 micrometers to 12 micrometers, gap 215 has a depth in the range 1.8±0.3 micrometers. In another example, different wavelength bands might employ a gap in the range 0.8–2.5 micrometers.

Pillars 216 at two opposite corners of pixel 200 provide mechanical support for platform 210 by means of arms 212.

Resistor 220, sometimes called the detector of a bolometer, is formed on platform 210, so that infrared absorbed by platform 210 heats the resistor and changes its resistance in proportion to its temperature. Resistor 220 has a high rate of change of resistance with temperature (temperature coefficient) so as to maximize the signal change for differing brightness of the incident radiation. Temperature coefficient depends upon the material employed; vanadium oxide has suitable properties. Total resistance depends upon both the material and the shape of the resistor. Resistor body 221 has a rectangular shape matching that of platform body 211, to realize a lower overall resistance value and to expose as much as possible of its bulk to the temperature of platform body 211 for good thermal contact. Suitably low resistance produces sufficiently large readout current with voltages low enough not to damage the thin structures or to require high-voltage CMOS circuitry. Also, low resistance leads to large resistor volume, which lowers the density of 1/f noise in the resistor. This shape also permits the desired low resistance with a thinner layer, so as to enhance its optical properties. That is, because the resistor material does not appreciably absorb infrared, it should be as transparent as possible, so that the remainder of platform body 210 can absorb the incident radiation as efficiently as possible. For thicknesses in the range of 50 nm to 100 nm, mixed vanadium oxides ($VO_x$) have a sheet resistance of about 50–400 kΩ/square, and the total resistance of resistor body 221 is in the same range, with the particular embodiment of FIG. 3 having a resistance of about 100 kΩ.

Resistor arms 222 follow the shape of platform arms 212. Contacts 223 and 224 connect resistor 220 to conductors 230 at the proper times. In this embodiment, contact 231 couples one end of resistor 220 continuously to a supply voltage. Contact 224 at the other end couples to an FET (not shown) formed in substrate 141 and also coupled to address line 233. As each row of pixels of array 140 is sequentially addressed by a voltage on conductor 233, all FETs in the row turn on, connecting signal line 234 to all resistors 220 in that row. A current determined by the temperature of each resistor in that row flows through signal conductor 234 to detection circuits 150, FIG. 1, which can also be formed in substrate 141, along with pixels 200.

Figure 4:
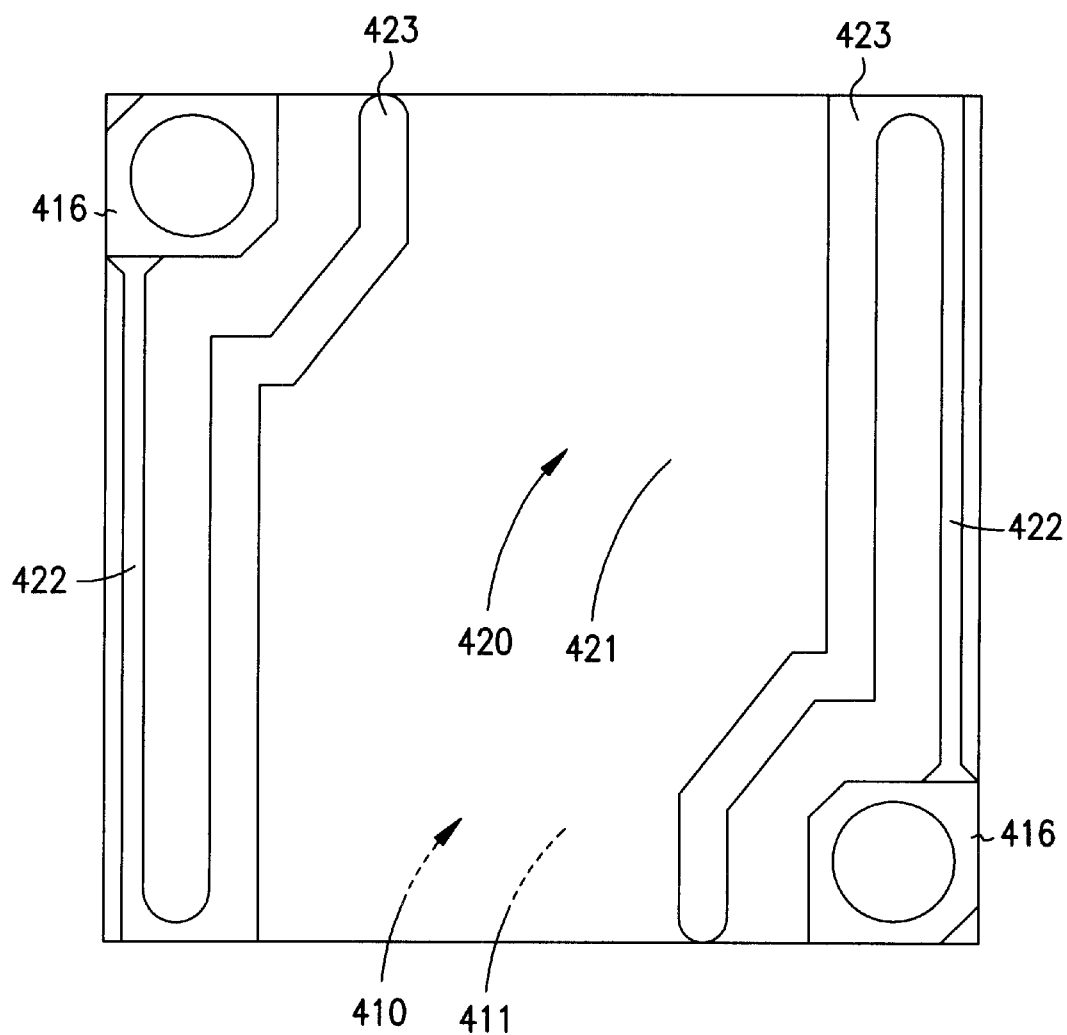
FIG. 4 is a top view of another pixel according to the invention.

FIG. 4 is a top view of another pixel embodiment 400. Pixel 400 shares the features and characteristics of pixel 200 except as noted.

In an imaging array such as 140, it is important to maximize the fill factor of the array. That is, the area of the absorber platforms should occupy as much of the total pixel area as possible. Absorbing as much as possible of the incident radiation makes the array more sensitive. To this purpose, opposite corners of platform body 411 have been cut away to accommodate the necessary dimensions of pillars. While the shape of platform body 411 remains substantially rectangular, the fill factor of the array is thereby increased without significantly reducing the total area of each pixel's absorbing surface.416. Some technologies permit buried pillars, allowing an even higher fill factor.

Resistor 420 has a configuration that enhances the above-mentioned desirable properties for resistor 220. The long thin configuration of arms 222 gives them an undesirably high resistance. However, arms 422 are fabricated of a metal or other lower-resistivity material, such as nickel chromium (Ni:Cr), because the arms need not possess either a high resistivity or any temperature dependence. To maintain low total resistance despite the high-resistivity material of the resistor body, the low-resistivity material of arms 422 is extended onto platform body 411 to form resistor contacts 423 along opposite sides of resistor body 421. If two of the opposite sides are longer than the others, as is the case in FIG. 4, placing contacts 423 along the longest opposite sides minimizes the total resistance of body 421. Configuring resistor body as a single continuous sheet then minimizes its total resistance for a given resistor material.

Figure 5:
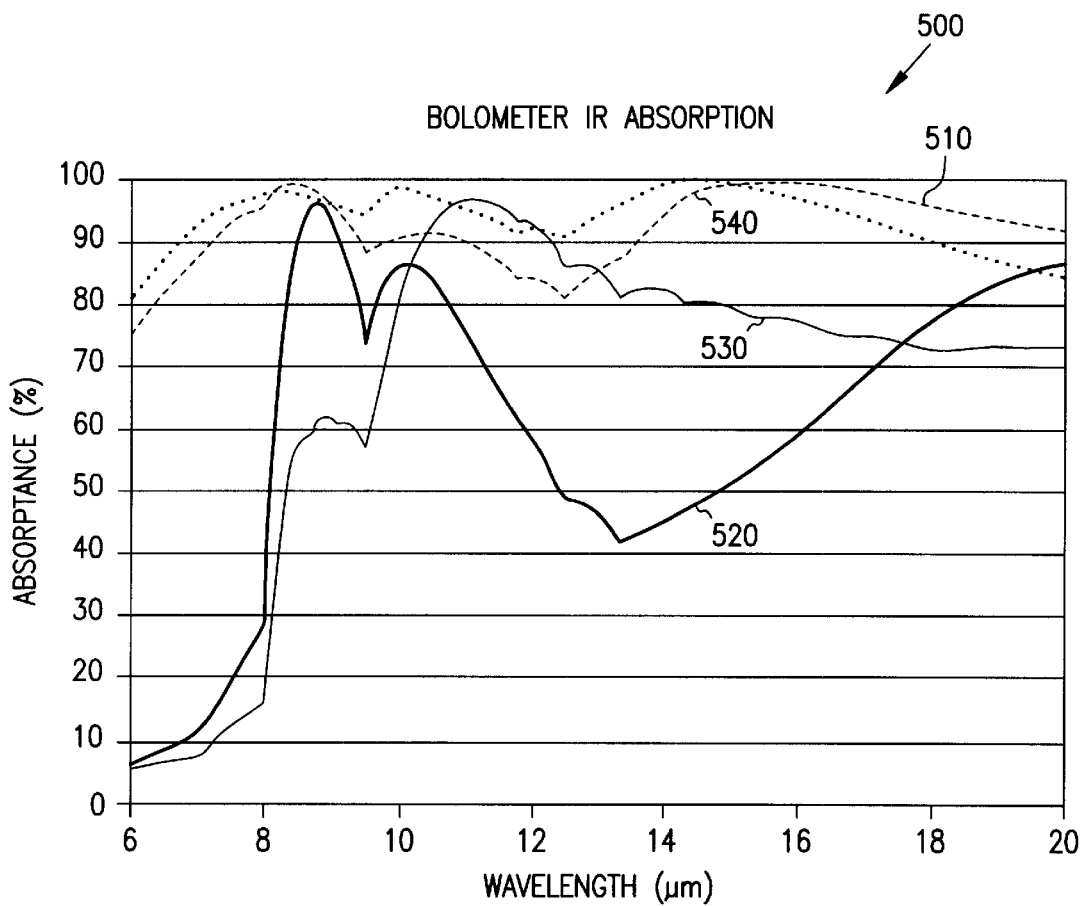
FIG. 5 is a graph of the wavelength response of the pixels of FIGS. 2–4, along with representative responses of conventional pixels.

FIG. 5 is a graph 500 depicting the relative response 510 of a bolometer pixel as shown in FIGS. 2–4 over a wide range of infrared wavelengths. Graph 500 is calibrated in terms of electrical output signal relative to the maximum output over the wavelengths from 6 micrometers to about 18 micrometers. Wavelengths useful for imaging animals and common structures in the environment range from the visible to the far infrared. Thus, the wider the bandwidth of an infrared detector, the more faithful the image will be.

Curve 510 demonstrates that pixel 200 has a relative response >96% over a reference band of 8–12 micrometers, where thermal radiation (=300K) peaks. Its useful response remains >90% from 7 micrometers to greater than 18 micrometers. Variation over the entire range is low, and response drops smoothly toward the short wavelengths. Response at wavelengths larger than 20 micrometers is generally not a problem. Adjusting the size of gap 215 can emphasize response at different wavelengths, if desired.

Curve 520 represents a baseline pixel having a silicon nitride platform of conventional thickness; about 0.8 micrometer. This pixel has a response restricted to the conventional wavelength range of 8–12 micrometers, where it has 78% absorptance. Response falls off precipitously below 8 micrometers, peaks sharply, and then varies widely beyond 12 micrometers. Curve 530 shows a pixel having a smaller thickness than the baseline pixel, but otherwise similar to it. Its absorptance is better, but falls off more sharply at the 8 micrometers end of the band, and still peaks sharply Curve 540 illustrates the response of a thin pixel having a silicon-nitride platform body and a 500-ohm bottom absorber. Absorptance has increased to 92% over the same band, and extends farther toward the shorter wavelengths. Significant peaks still exist, however.

What is claimed is:

1. An imaging detector for infrared radiation in the approximate range of 6 to 18 micrometers, comprising an array of pixels on a common substrate, each pixel comprising:

a thermally isolated absorber platform having a thickness equal to or less than approximately 0.5 micrometer and a layer of metal, and separated from the substrate by a gap in the approximate range of 0.8 to 2.5 micrometers;

a temperature-dependent resistor disposed on the platform and having at least one pair of opposite sides;

a reflective layer on the substrate;

a set of conductors electrically coupled to the resistor along a substantial portion of the length of the opposite sides.

2. The detector of claim 1 further comprising detection circuits coupled to at least some of the conductors.

3. The detector of claim 2 where the detection circuits are disposed on the substrate.

4. The detector of claim 2 further comprising an image display.

5. The detector of claim 4 further comprising a scan generator coupled to the detection circuits for scanning the pixels in the array.

6. The detector of claim 5 where the scan generator is further coupled to the image display.

7. A microbolometer pixel comprising:

a substrate;

a platform body having a thickness less than about 0.5 micrometer and including a layer of metal for enhancing absorption;

a substantially rectangular temperature-sensitive resistor layer having a pair of opposite sides on the platform body;

a pair of arms for suspending the body over the substrate so as to form a gap therebetween;

a pair of low-resistance electrical contacts extending along substantially all the length of the pair of opposite sides.

8. The bolometer pixel of claim 7 where the resistor has further opposite sides.

9. The bolometer pixel of claim 8 where the pair of opposite sides are longer than the further opposite sides.

10. The bolometer pixel of claim 7 where the electrical contacts are a layer of metal.

11. The bolometer pixel of claim 10 where the electrical contacts are nickel chromium.

12. The bolometer pixel of claim 11 where the layer for enhancing absorption is nickel chromium.

13. The bolometer pixel of claim 10 where the substrate includes a reflecting layer on the substrate under the platform body.

14. The bolometer pixel of claim 10 where the reflecting layer is nickel chromium.

15. The bolometer pixel of claim 10 where the layer of metal forming the electrical contacts extends over substantially all the length of the arms.

16. The bolometer pixel of claim 7 where the resistor is an oxide of vanadium.

17. The bolometer pixel of claim 16 where the total resistance of the resistor is in the approximate range of 50 to 400 kiloohms.

18. The bolometer pixel of claim 17 where the total resistance of the resistor is about 100 kiloohms.

19. A microbolometer pixel comprising:

a substrate;

a platform body having a thickness less than about 0.5 micrometer and including a layer of metal for enhancing absorption;

a temperature-sensitive resistor layer having a periphery on the platform body;

a pair of arms forming a single continuous sheet with the platform body for suspending the body over the substrate so as to form a gap therebetween;

a pair of low-resistance electrical contacts extending along at least about half of the periphery of the resistor layer.

20. The bolometer pixel of claim 19 where the electrical contacts comprise a metal layer.

21. The bolometer pixel of claim 19 where the resistor is exposed directly to incident infrared radiation.

22. The bolometer pixel of claim 21 where the resistor is substantially transparent to the incident radiation.

23. The bolometer pixel of claim 19 where the platform body comprises silicon oxide and silicon nitride entirely underlying the silicon oxide.

24. The bolometer pixel of claim 23 where the layer of metal lies between the silicon oxide and the silicon nitride.

* * * * *